US005790940A

United States Patent [19]
Laborde et al.

[11] Patent Number: 5,790,940
[45] Date of Patent: *Aug. 4, 1998

[54] POWER CONTROL FOR TDMA MOBILE SATELLITE COMMUNICATION SYSTEM

[75] Inventors: Enrique Laborde, Gaithersburg; James Eryx Malcolm, Bethesda; Robert Carroll Marquart, Germantown; Adrian Morris, Gaithersburg, all of Md.

[73] Assignee: Hughes Electronics Corporation, El Segundo, Calif.

[*] Notice: The term of this patent shall not extend beyond the expiration date of Pat. No. 5,710,982.

[21] Appl. No.: 896,337

[22] Filed: Jul. 18, 1997

Related U.S. Application Data

[62] Division of Ser. No. 496,633, Jun. 29, 1995, Pat. No. 5,710,982.

[51] Int. Cl.$^6$ .............................. H04B 1/00; H04B 7/00
[52] U.S. Cl. ............................................. 455/69; 455/126
[58] Field of Search ............................. 455/517, 524, 455/69, 70, 126, 88

[56] References Cited

U.S. PATENT DOCUMENTS

| | | | |
|---|---|---|---|
| 4,580,262 | 4/1986 | Naylor et al. | 455/69 |
| 5,128,965 | 7/1992 | Henriksson | 455/69 |
| 5,129,098 | 7/1992 | McGirr et al. | 455/69 |
| 5,204,970 | 4/1993 | Stengel et al. | 455/69 |
| 5,216,692 | 6/1993 | Ling | 375/1 |
| 5,241,565 | 8/1993 | Kloc et al. | 455/72 |
| 5,241,690 | 8/1993 | Larsson et al. | 455/69 |
| 5,257,283 | 10/1993 | Gilhousen et al. | 455/69 |
| 5,267,262 | 11/1993 | Wheatley, III | 455/69 |
| 5,278,992 | 1/1994 | Su et al. | 455/69 |
| 5,305,468 | 4/1994 | Bruckert et al. | 455/69 |
| 5,333,175 | 7/1994 | Ariyavisitakul et al. | 455/69 |
| 5,386,589 | 1/1995 | Kanai | 455/69 |
| 5,465,399 | 11/1995 | Oberholtzer et al. | 455/69 |
| 5,564,074 | 10/1996 | Juntti | 455/69 |
| 5,564,075 | 10/1996 | Gourgue | 455/69 |
| 5,574,972 | 11/1996 | Hulbert | 455/70 |
| 5,574,983 | 11/1996 | Douzono et al. | 455/69 |
| 5,574,984 | 11/1996 | Reed et al. | 455/69 |
| 5,590,409 | 12/1996 | Sawahashi et al. | 455/69 |
| 5,604,730 | 2/1997 | Tiedemann et al. | 455/69 |

*Primary Examiner*—Reinhard J. Eisenzopf
*Assistant Examiner*—Marsha D. Banks-Harold
*Attorney, Agent, or Firm*—John T. Whelan; Michael Sales

[57] ABSTRACT

A method and system for adjusting the transmission power of a transmitter during a communication with a receiver in a mobile satellite communication system is disclosed herein. The method comprises establishing at least one threshold signal strength value for a transmitted burst; measuring the received signal strength of the burst received by the receiver; comparing the received signal strength with the threshold value; and setting a power control bit based on the comparison. The system comprises a plurality of mobile terminals having a first stored threshold value; a satellite adapted to communicate with each of the mobile terminals; at least one gateway in communication with the satellite, the gateway having a second stored threshold value, and including a routine for measuring the received signal strength of a burst signal transmitted from the mobile terminal, for comparing the received signal strength with the second stored threshold value, and for adjusting the transmission power of the gateway based on the comparison; and each of the mobile terminals including a routine for measuring the received signal strength of a burst signal transmitted from the gateway to the mobile terminals, for comparing the received signal strength with the first stored threshold value, and for adjusting the transmission power of the mobile terminal based on the comparison.

13 Claims, 4 Drawing Sheets

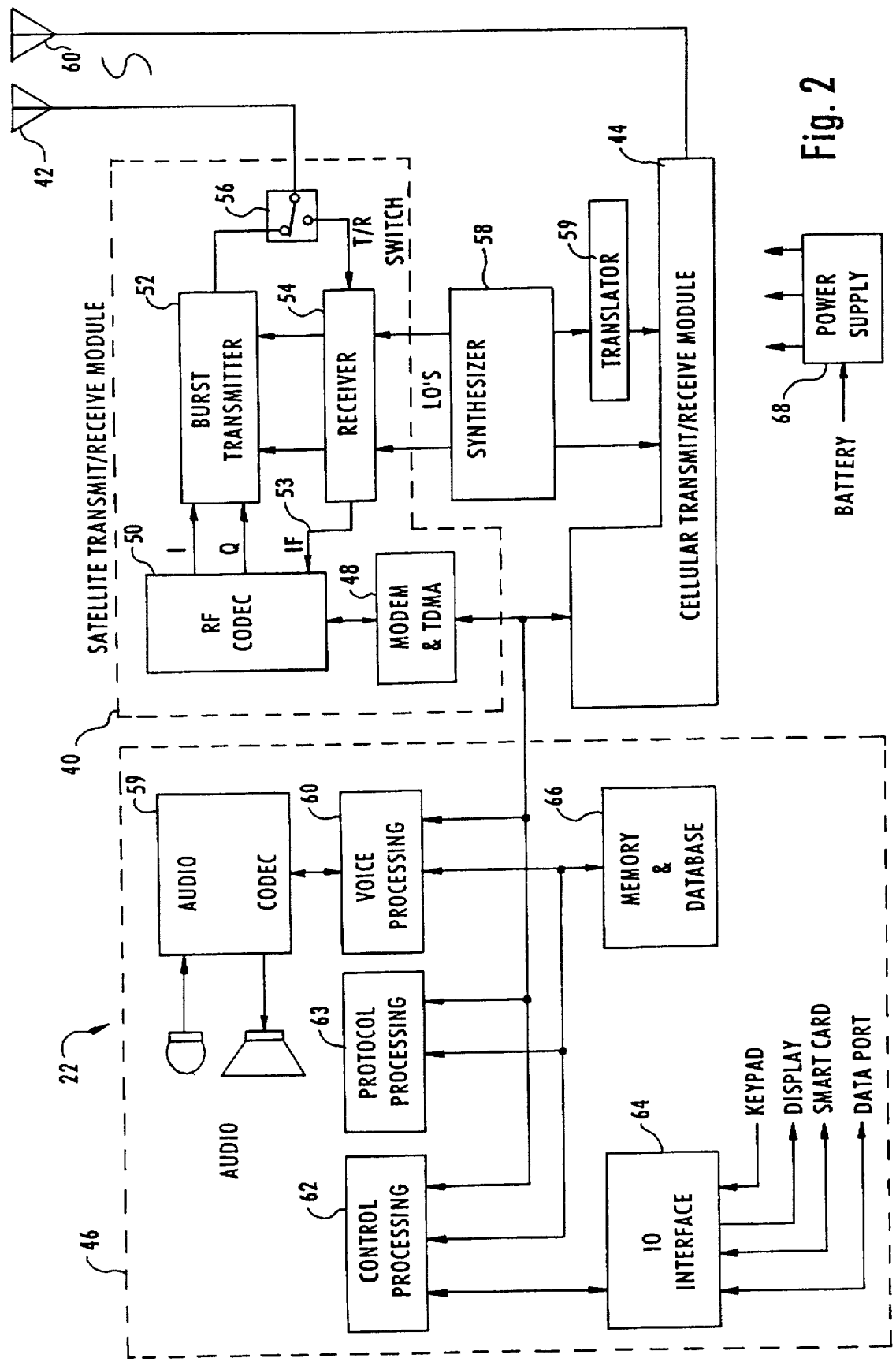

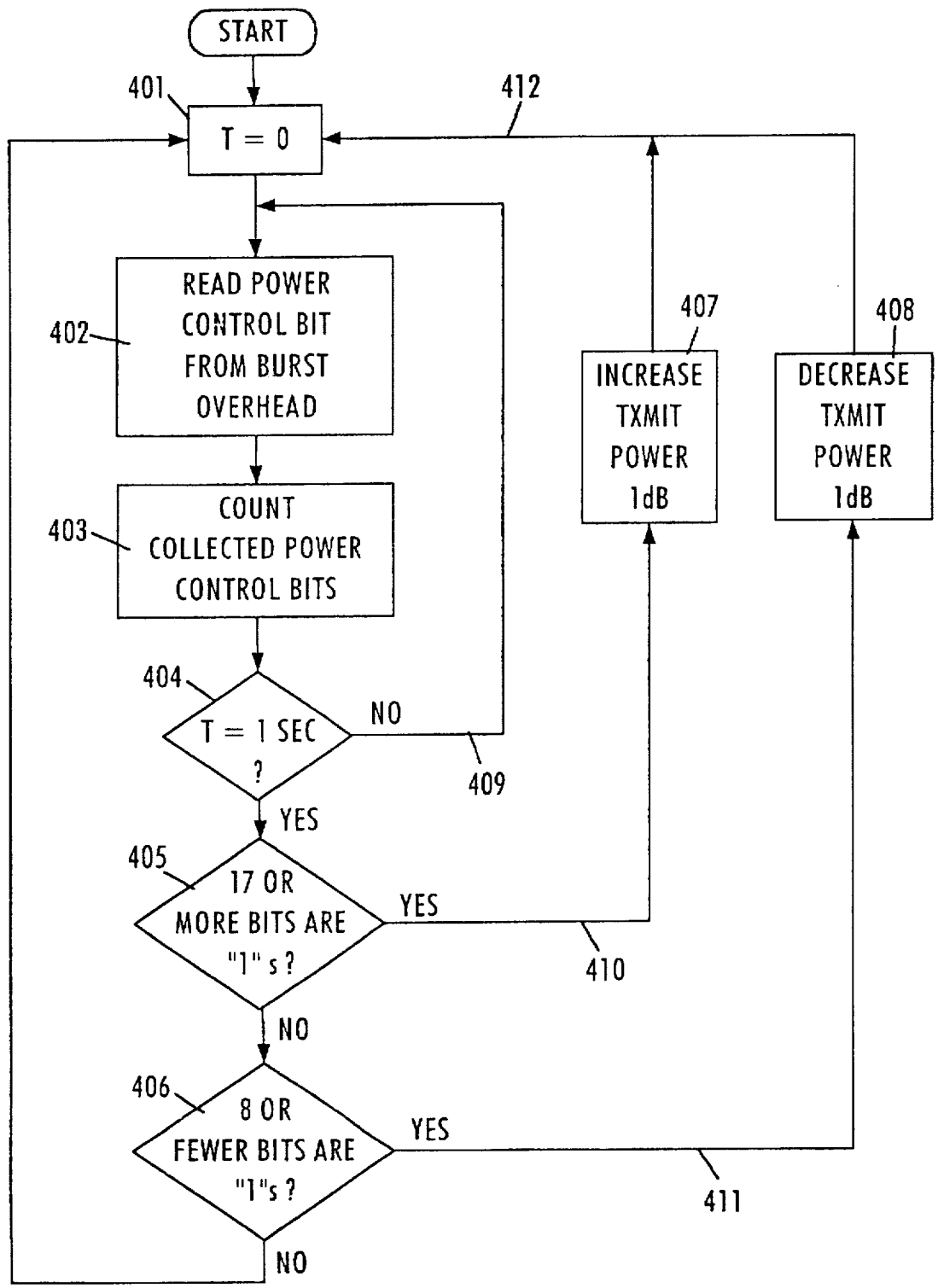

POWER CONTROL FOR TDMA MOBILE SATELLITE COMMUNICATION SYSTEM

This application is a Divisional under 37 CFR 1.60 of application Ser. No. 08/496,633, filed on Jun. 29, 1995, now U.S. Pat. No. 5,710,982, the entire contents of which are hereby incorporated by reference.

BACKGROUND OF THE INVENTION

The present invention relates to cellular and satellite communications. More particularly, the invention relates to a method and system for controlling transmission power during an ongoing communication between a transmitter and a receiver in a TDMA mobile satellite communication system.

Mobile satellite communication systems generally comprise at least one satellite, at least one fixed ground terminal such as a gateway, and a plurality of mobile terminals. The mobile terminals communicate with the gateway or other mobile terminals via the satellite over communication channels using time division multiple access (TDMA).

The transmission power in the various system components must be carefully controlled in order for the system to operate efficiently. This is particularly true for the numerous hand-held mobile terminals. Although the mobile terminals are capable of operating at high power levels, such transmission excessively drains the battery source in the mobile terminal. Furthermore, interference and noise become an increased problem at higher power levels. An ideal transmission power level may therefore exist between certain power or signal strength thresholds to provide each user an acceptable performance level with minimum transmit power in both the forward and return links.

Thus, there is a need for a method and system to accommodate varying power requirements, and to provide each user with an acceptable performance level using the minimum transmit power in both forward and return communication links.

SUMMARY OF THE INVENTION

Accordingly, the present invention is directed to a method and system that substantially obviates one or more of the problems due to limitations and disadvantages of the related art.

To achieve these and other advantages, and in accordance with the purpose of the present invention, as embodied and broadly described herein, the invention is a method of controlling and adjusting the transmit power according to variations in attenuations experienced in the forward and return communication links. These variations occur due to changing shadowing conditions and antenna gain variations within the L-band spot beam coverage area.

In one particular aspect of the present invention, a method is provided for adjusting the transmission power of a transmitter during burst communications with a receiver, the method comprising establishing at least one threshold signal strength value for a transmitted burst, measuring the received signal strength of the burst received by the receiver, comparing the received signal strength with the threshold value, and setting a power control bit based on the comparison.

In another aspect of the invention, a mobile satellite communications system is provided comprising a plurality of mobile terminals having a first stored threshold value; a satellite adapted to communicate with each of the mobile terminals; at least one gateway in communication with the satellite, the gateway having a second stored threshold value, and including a routine for measuring the received signal strength of a burst signal transmitted from the mobile terminal, for comparing the received signal strength with the second stored threshold value, and for adjusting the transmission power of the gateway based on the comparison; and each of the mobile terminals including a routine for measuring the received signal strength of a burst signal transmitted from the gateway to the mobile terminals, for comparing the received signal strength with the first stored threshold value, and for adjusting the transmission power of the mobile terminal based on the comparison.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one embodiment of the invention and together with the description serve to explain the principles of the invention.

BRIEF DESCRIPTION OF THE DRAWINGS

FIG. 2 is a block diagram of a preferred embodiment of a mobile terminal for use in the mobile satellite communication system of FIG. 1.

FIG. 5 is a flow chart illustrating a method of power control in a transmitter in accordance with one embodiment of the present invention.

DETAILED DESCRIPTION OF THE PREFERRED EMBODIMENT

Figure 1:
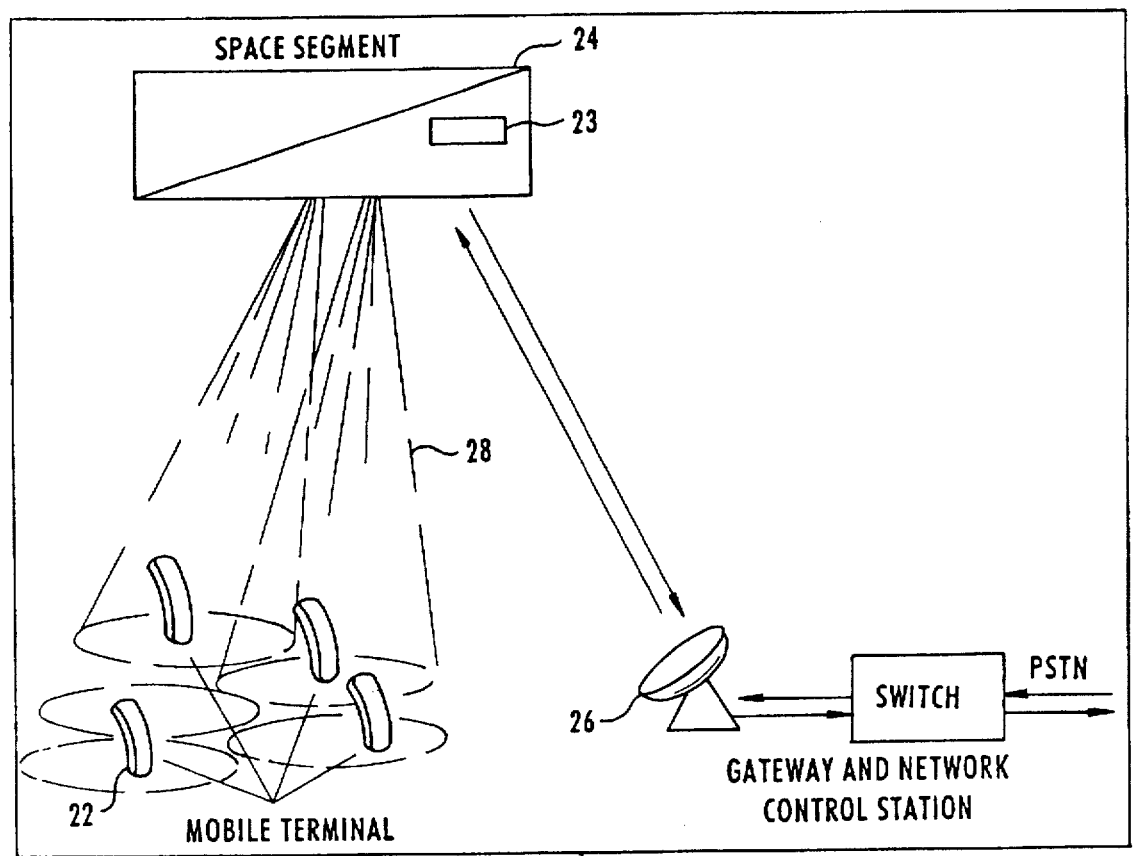
FIG. 1 is a block diagram of a mobile satellite communication system incorporating the principles of the present invention.

Referring now to the drawings, and more particularly to FIG. 1, a preferred embodiment of a mobile satellite communication system 20 is illustrated. The mobile communication system 20 includes at least one mobile terminal 22, at least one space segment 24 such as a satellite, and at least one gateway earth station 26.

The mobile terminal 22 is preferably either a handheld phone or a vehicle-mounted unit. The term mobile terminal indicates that a terminal may be used by a mobile user. It is well known in the art that a mobile terminal can also be operated in a fixed station, thus, the term mobile terminal also includes fixed terminals. The use of the term mobile terminal in this description, therefore, can also encompass fixed terminals.

The mobile terminal 22 communicates with the space segment 24 via an L-band frequency in a spot beam 28. Each spot beam 28 is associated with a predetermined geographic region. The gateway 26 communicates with the space segment 24 over a Ku band frequency. The space segment 24 includes transponders for translating between the L-band spot beam signals used by the mobile terminals 22 and the Ku-Band signals used by the gateways 26. The gateway 26 interfaces with a terrestrial telephony carrier, such as the public switched telephone network (PSTN), and may also interface with a cellular network. Thus, a user may place a call on the mobile terminal 22 to either a land line user over the PSTN or to a cellular phone user over the cellular network.

The space segment 24 preferably provides L-band-to-L-band TDMA bent pipe single hop communication to support mobile to mobile communication. At the space segment 24, the L-band uplink and downlink are transmitted via multiple spot beams. In the preferred embodiments, small spot size within each spot beam 28 provides a link margin allowing the satellite 24 to communicate with low power mobile terminals 22. In addition, the preferred embodiment provides for frequency reuse so that many, preferably about 16,000, users may be served using a limited amount of L-band spectrum. Preferably, the bandwidth of each spot beam 28 can be varied to accommodate changing traffic patterns.

Terminals to the system have a unique telephone number that allows them to receive calls when they are registered in a space segment 24 coverage area. A registration procedure locates the mobile 22 within a particular spot beam 28 coverage area when the mobile terminal 22 is turned on.

The mobile terminal 22 can receive calls from any terrestrial facility by connecting the call through one of the gateway stations 26. At this point, the gateway 26 determines the location of the mobile 22 and sends a message to the mobile terminal 22 to announce the incoming call.

The system 20 utilizes low rate encoded voice transmission. Preferably, some of the mobiles 22 are dual mode, allowing voice communications either via satellite or via the local cellular system. The gateway earth station 26 provides for user mobility as the user's mobile terminal 22 moves from spot beam 28 to spot beam 28.

In addition to the communication channels carried by the space segment 24, some of the space segment resources are used for control functions. In the preferred embodiment, one or more channels in each spot beam 28 are control channels. For example, the gateway station 26 places a forward control signal in each spot beam 28 to allow synchronization of the mobile terminals 22 and to carry network control information from the gateway station 26 to the mobile terminals 22.

The forward control channels allow mobile terminals 22 to acquire a satellite carrier and identify the spot beam 28 and gateway station 26 that originates the signal. The gateway 26 uses the forward control channel to page mobiles 22 using their unique address to announce mobile terminated calls.

Each spot beam 28 preferably contains a return direction signaling channel that mobile terminals 22 use to initiate calls or to register with the gateway 26.

During a call, in-band low data rate control channels are preferably available between the mobile 22 and the gateway 26 for call supervision, power control, and to indicate call termination.

A preferred embodiment of a mobile terminal 22 is 20 shown in FIG. 2. The mobile terminal 22 includes a satellite module 40, a satellite antenna 42, a cellular module 44, and a user interface module 46. The satellite module 40 is coupled to the user interface module 46, the cellular module 44, and the satellite antenna 42. Preferably, the satellite antenna 42 is a physically small antenna, such as a helix type antenna. The satellite module 40 includes a modem and TDMA unit 48, an RF coder and decoder 50, a burst transmitter 52, a receiver 54, and a transmit or receive (T/R) switch 30 56. In the preferred embodiment, the modem 48 is connected to the RF codec 50, and the RF coded 50 is connected to the burst transmitter 52 and to the receiver 54. The T/R switch 56 is connected to the burst transmitter 52, the receiver 54, and the satellite antenna 42.

Within the satellite module 40, the modem 48 converts speech or data samples to and from channel symbols using quadrature phase shift key modulation (QPSK). QPSK is preferably performed digitally by an application-specific integrated circuit or alternatively on a commercially available digital signal processor. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48.

The burst transmitter 52 converts the I and Q signals from the RF codec 50 up to a desired frequency, preferably an L-band frequency, for transmission by the first antenna 42. The receiver 54 converts a received L-band signal from the first antenna 42 into the IF signal 53 sent to the RF codec 50.

The T/R switch 56 allows the mobile terminal 22 to either transmit data or receive data. Since the preferred mobile terminal 22 does not transmit and receive simultaneously, the mobile terminal 22 does not need a large filter to isolate the transmission and reception paths. Many conventional mobile terminals require a duplexor or similar device to perform such filtering. However, conventional mobile terminals 22 with duplexors are more costly, add weight, and add approximately one-half dB of undesirable insertion loss.

The mobile terminal 22 also includes a synthesizer 58 that provides a fixed local oscillator signal for the RF codec 50. The synthesizer 58 includes a variable local oscillator for channel tuning within the satellite module 40 and generates data clock signals for the modem 48. Both the fixed local oscillator and the variable local oscillator within the synthesizer 58 may be adjusted based on commands from either the gateway 26 or from another mobile terminal 22. In the preferred embodiment, the synthesizer 58 is connected to the receiver 54 and to the cellular module 44.

The user interface module 46 includes an audio and codec unit 59, a voice processing unit 60, a controller 62, an input/output (I/O) interface 64, and a memory 66. Preferably, each element within the user interface module 46 communicates with the other user interface elements.

The audio unit 59 digitizes an audio analog signal from a telephone handset (not shown) into a digital 64 Kilobit per second (Kb/s) pulse code modulation (PCM) signal. The audio unit 59 also converts digital PCM signals into an audio signal transmitted to the telephone handset (not shown).

The voice processing unit 60 includes a voice transcoder that performs source coding to compress the digital 64 Kb/s PCM signal. Specifically, an encoder running on a programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known to those skilled in the art. Both the CELP type and the MBE type encoder produce an output having a voice quality which has been measured as having a MOS of 3.2. Of course, if an application allows a lower quality voice signal, such as in a military application, even lower rate encoding could be used.

The controller 62 preferably provides a multi-tasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port, for digital communication such as a facsimile transmission, and a smart card interface as specified for GSM.

The cellular module 44 allows the mobile terminal 22 to communicate with a cellular system over a second antenna 60. The second antenna is a linearly polarized whip meeting cellular system standards and the cellular module 44 uses standard components, such as a GSM chip set, known to those skilled in the art. Preferably, the mobile terminal 22 operates in a first mode where the terminal 22 functions as a conventional cellular phone. In a second mode, the mobile terminal 22 preferably operates so that the mobile terminal 22 communicates with the satellite 24. A battery 68 is provided for portable operation of the mobile terminal 22.

The preferred mobile terminal 22 has many advantages. For example, the mobile terminal 22 provides dual-mode operation, either cellular or satellite. Also, the mobile terminal 22 provides high quality digital voice with a measured MOS score from about 3.2 to 4.0. Further, the mobile terminal 22 allows for paging and messaging, transmission at a 2400 or 4800 bps data rate via the data port, and provides a convenient cellular-like interface. Also, the mobile terminal 22 may transmit on a single channel using a single time slot within a carrier signal allowing many other mobile terminals 22 to transmit over the same carrier. Thus, the mobile terminal 22 efficiently transmits over scarce L-band frequency resources.

Figure 3:
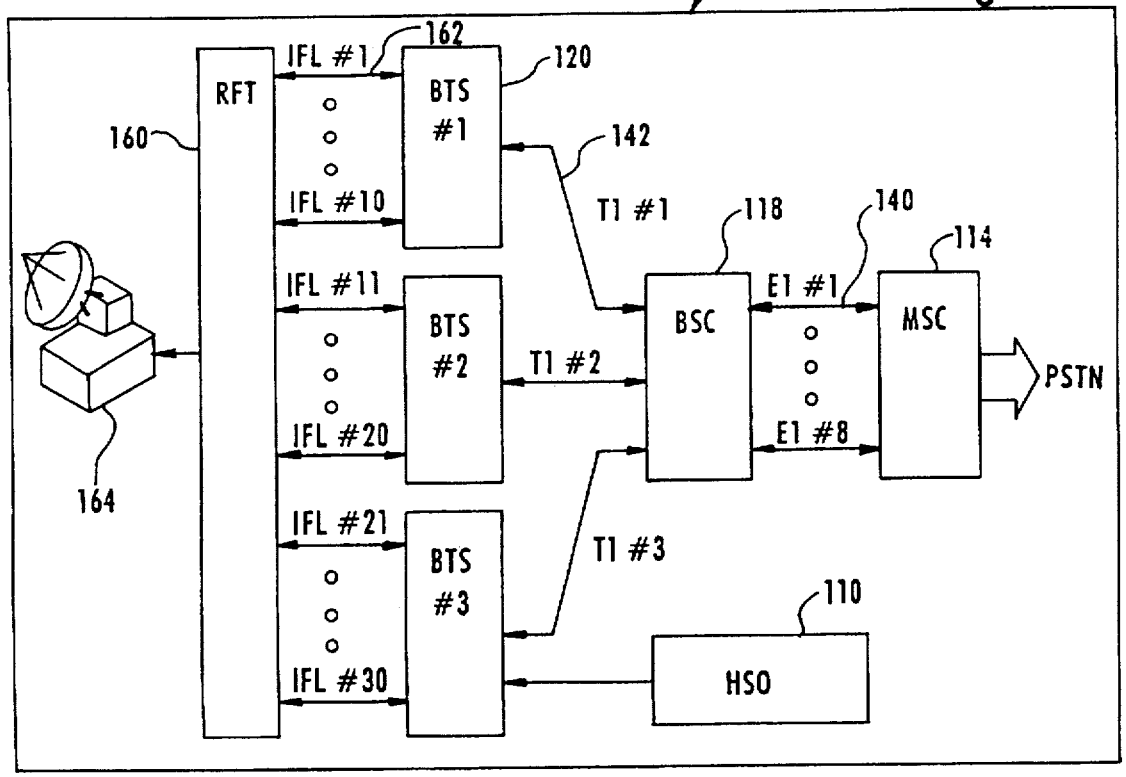
FIG. 3 is a block diagram of a preferred embodiment of a gateway earth station for use in the mobile satellite communication system of FIG. 1.

FIG. 3 is a block diagram of a preferred embodiment of a gateway 26. The gateway 26 includes a mobile switching center (MSC) 114, a plurality of base station controllers (BSCs) 118, a plurality of base transceiver stations (BTS) 120, a radio frequency unit 160, and a high-stability oscillator (HSO) 110. The MSC 114 allows communication with the public switched telephone network (PSTN) and other mobile switching centers. The MSC 114 is connected, preferably by an Ainterface 140 such as a standard E1 or E3 line, with at least one BSC 118. The BSC 118 is connected through a communication channel 142, such as a T1 line, to one or more of the base transceiver stations (BTS) 120. Each BTS 120 may communicate over an RF frequency with a mobile terminal 22. The HSO 110 provides a reference frequency signal to the BSC 118 and the BTS 120. The HSO preferably has an accuracy of $\pm 1 \times 10^8$.

A telephone "call" may be originated from the mobile terminal 22 by transmitting initialization data up to the space segment 24 over a control channel and then down to the gateway 26. In the preferred embodiment, the control channel is received over a time slot within a frequency assigned to a spot beam 28 having a coverage area surrounding the mobile terminal 22. At the gateway 26, the call is transmitted/received via an RF channel in the radio frequency unit 160 to the BTS 120 assigned to the spot beam 28 servicing the mobile terminal 22. From the BTS 120, the call is routed to the BSC 118, and then to the MSC 114. From the MSC 114, the call is routed to either the PSTN or another MSC. Thereafter, a communication channel is established through the entire gateway 26, and a terminal using the mobile terminal 22 may communicate over the established communication channel.

Calls may also originate from either the PSTN or another MSC. Such a call enters the gateway 26 at the MSC 114 and is routed to one of the BSCs 118. The BSC 118 then pages the mobile terminal 22 via the appropriate BTS 120. After the mobile terminal 22 responds to the page from the BTS 120, a communication channel is established.

Power control procedures in accordance with the present invention may be initiated by the mobile terminal 22 during an initial access procedure. An initial power control procedure determines the power level to be used by mobile terminals to execute the contention access procedures. The main purpose of the initial access power control is to prevent unacceptable levels of interference to other users.

For the initial transmission, the mobile terminal 22 will set its power to an initial level obtained by adding 3 dB to the last power setting used at the end of the last call to the gateway. Mobile terminals that have not stored the power level of the last call (e.g., mobile terminals that are accessing the network for the first time) with use its maximum power as the default value for the initial power. If the calculated initial power exceeds the maximum power level of the mobile terminal, the mobile terminal transmits at its maximum power.

When the transmission by the mobile terminal 22 at the calculated initial power level fails to be acknowledged over the forward control channel, the mobile terminal 22 increases the power level in each subsequent attempt by a value given by the level of the initial power increment parameter, IN_PW_INC.

The maximum number of attempts allowed to the mobile terminal 22 before declaring the failure of the initial access procedure is given by the parameter IN_ACC_MAX. The values for the parameters IN_PW_INC and IN_ACC_MAX are included in the power control message broadcasted over the Network Information Channel ("NIC").

Prior to describing in more detail the exemplary embodiment of that portion of the system and method for effecting power control between a transmitter and receiver in the present invention, an explanation and detailed description of the meaning of the letter designations is set forth.

The power is defined in this disclosure as the average power transmitted during the periods where the carrier is transmitting. Furthermore, because transmission/receiving antennae are integrated into the mobile terminals, transmitted power is defined in terms of the effective isotropic radiated power (EIRP). Maximum EIRP is defined in the direction from the mobile terminal at which maximum power is transmitted, as observed in the far field.

The designation RSS refers to the received signal strength that determines the combined power of the received signal, noise, and interference on a relatively long-term average basis. The RSS preferably comprises these received parameters, although additional factors may be present or absent.

The designation SQI refers to the signal quality indicator, which characterizes the instantaneous carrier-to-interference ratio of the received burst. SQI may be derived from measuring the "eye opening" information available at the demodulator, or it may represent any conventionally known indicator of signal quality. The SQI is not intended to be restricted to the carrier-to-interference ratio however.

The designation RSS_LOW_THRS refers to the fixed low threshold of received signal strength used to determine the value of the power control bit to be sent to the transmit side. This value is included in a power control message broadcasted to the mobile transmitters via the ("NIC").

Similarly, the designation RSS_HIGH_THRS refers to the maximum received signal strength threshold. This value is also received from a power control message broadcast to the NIC.

The designation SQI_NOM refers to a nominal signal quality indicator which is also downloaded via the NIC.

In the illustrated system, power control messages are passed back and forth between the transmitter and receiver via a power control bit reserved in the overhead portion of the burst. The application of the power control step shall be at the frame following the estimation of the power adjustment. An overview of the adaptive power control features follows.

Throughout the duration of voice calls, the procedure for tracking the changes in link attenuation over the transport traffic channels relies on periodic incremental adjustments of the transmit power at the gateway and the mobile terminal, based on feedback received from the receiving side of the link. Each participant in the call will compare the signal received from the other side with a target operating point. If the received signal is stronger than the target operating point, the correspondent will be directed to reduce its transmit power. If below the target operation, increased power will be requested.

The preferred step sizes of the adjustment are +1, 0, and −1 dB. The periodicity of the corrections is preferably 1 second. Adjustments to the transmit power are triggered by power control bits received from the receiving side on the overhead of each burst (25 power control bits per second in the case of continuous transmission once every frame with the 40 msec frame duration). These power control bits are set to "1" by the receive side when an increase in transmit power is desired, and set to "0" when a reduction in power is desired.

A majority voting procedure with thresholds is used with the power control bits accumulated on the transmit side during the power control interval of 1 second. In the case of continuous transmission with 25 power control bits per second, if 17 or more power control bits out of the 25 are received as "1," the transmit power will be increased by 1 dB. If 8 or fewer "1s" are received, the transmit power will be decreased by 1 dB. If 9 through 16 "1s" are received, the power will remain unchanged.

At the receiver, the setting of power control bits to "1" or "0" are governed by two received signal quality measurements available from the demodulator: RSS, which determines the combined power of the received signal, noise, and interference on a relatively long-term average basis; and a the SQI, which characterizing the instantaneous carrier-to-interference (C/I) ratio of the received burst. As stated previously, the SQI may be derived from measuring the eye opening information available at the demodulator.

These two measurements are combined with fixed thresholds to determine the value of the power control bit to be sent to the transmit side. The use of the fixed thresholds is as follows:

If the measured RSS is lower than the minimum RSS required, RSS_LOW_THRS, the power control bit is set to "1" independently of the SQI value.

If the measured RSS is higher than the maximum RSS required, RSS_HIGH_THRS, the power control bit is set to "0" independently of the SQI value.

When the measured RSS is between RSS_LOW_THRS and RSS_HIGH_THRS, the measured SQI determines the value of the power control bit in its comparison with the nominal SQI (SQI_NOM).

The values for the two thresholds RSS_LOW_THRS and RSS_HIGH_THRS are included in the power control message broadcast to the mobile terminals via the NIC. These thresholds are expressed in dBs relative to the power of the BCC, as determined by the mobile terminal at its particular location rather than as absolute power levels.

Figure 4:
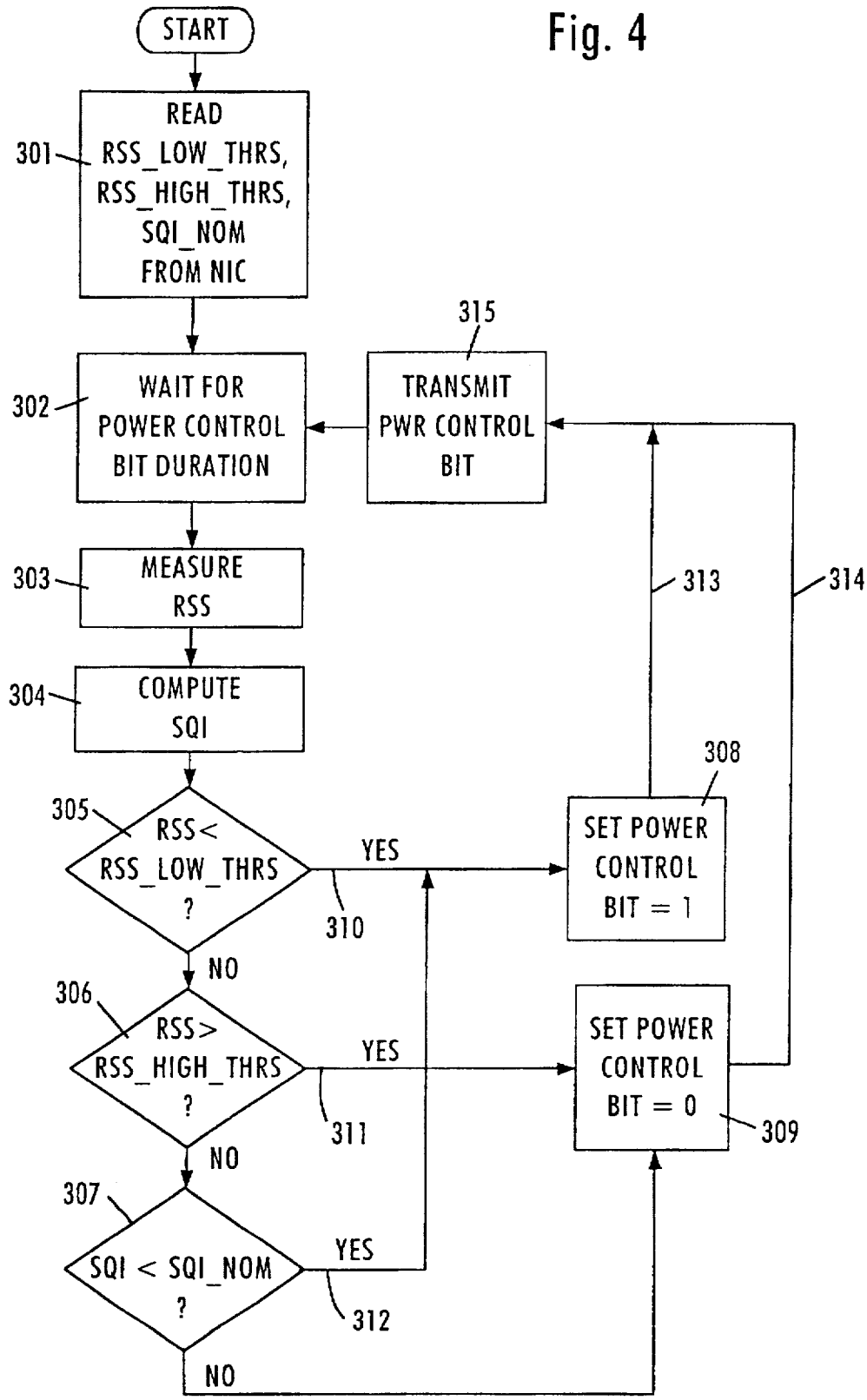
FIG. 4 is a flow chart illustrating a method of power control performed by a receiver in accordance with one embodiment of the present invention.

A more detailed description of the method and system of the invention is provided herein in connection with a description of the operation. In describing the operation, reference will be made to FIGS. 4 and 5 as appropriate. Referring to FIG. 4, which shows the power control functions within a receiver receiving burst signals from a transmitter, the receiver reads the values RSS_LOW_THRS, RSS_HIGH_THRS, and SQI_NOM from the NIC during a burst containing a power control message in the overhead, which is referred to at block 301. The receiver then waits for the appropriate power control bit duration that is representative of 25 power control bits per second. The duration is represented by block 302.

At this point, a burst sent from the transmitter is received by the receiver, and the RSS is measured as block 303. At this time, the SQI is also calculated using various other measurement parameters, such as the received signal noise, and RSS. The SQI computation occurs at block 304.

The RSS and SQI values are next compared with fixed thresholds to determine the value of the power control bits to be sent to the transmit side. As represented by block 305, the measured RSS is compared with RSS_LOW_THRS. If the RSS is less than RSS_LOW_THRS, the power control bit is set at block 308 to "1".If the RSS is not less than RSS_LOW_THRS, the RSS is next compared with RSS_HIGH_THRS at block 306. If RSS is greater than RSS_HIGH_THRS, the power control bit is set to "0" at block 309. Finally, if RSS is not greater than RSS_HIGH_THRS, the SQI is compared with SQI_NOM at block 307. If SQI is less than SQI_NOM, the power control bit is set to "1" at block 308. Otherwise, the power control bit is set to "0" at block 309.

The power control bits, whether set to 1 or 0, are transmitted in a return burst to the transmitter at block 315. The process begins again at block 302, where the system waits for another burst.

The corresponding transmitter unit simultaneously reads the power control bits sent back by the corresponding receiver and adjusts its transmission power accordingly. The procedures within the transmitter are shown in the flow chart of FIG. 5.

As shown in FIG. 5, a timing clock is initially set to zero at block 401. The burst overhead from the incoming burst from the corresponding receiver is read at block 402, and the power control bit is read. The bit is collected with any other previously read power control bits within the same timing period and grouped and summed according to the value of the bit at block 403. Thus, the bits that are "1"s are collected and counted, and the bits that are "0"s are collected and counted.

At blocks 404 and 409, a return loop is implemented to read further bits as long as the measurement is still occurring during the set time period, in this system preferably 1 second, although other time periods are contemplated. After the time period is complete, the collected bits are reviewed at blocks 405 and 406.

As shown in block 405, if the transmitter has collected 17 or more "1" bits, the transmit power is increased by 1 dB at block 407 via 410. As shown in block 406, if 8 or fewer bits are "1"s, the transmit power is decreased by 1 dB at block 408 via 411.

Note that both the transmitter and receiver can either be mobile terminals, gateways, satellites, or any other TDMA-capable devices. The maximum delay in setting the power control bit at the receive side, based on the combination of RSS and SQL will be less than the time offset between transmit and received burst plus one frame.

In summary, there has been described herein a power control system which provides each user of a mobile transmitter an acceptable level of performance with minimum transmit power both in the forward and return links. In the forward link, the adaptation of the transmitted power to shadowing and coverage of each individual user achieves a significant capacity improvement by eliminating the constant link margins that otherwise will be necessary. In the return link, transmit power control achieves increased battery life because of lower averaged transmit power and the mitigation of system interference, also resulting from lower transmitted power.

Furthermore, the method and system described is simple and efficient. The nearly simultaneous measurements occurring in each transmitter offer time-saving advantages over traditional power control methods.

Of course, it should be understood that a wide range of changes and modifications can be made to the preferred embodiment described above. For example, although the preferred embodiment focuses on telephony communication in a mobile telephone system, the preferred method may also be used in any system requiring multiple access of the same carrier frequency. Thus, it is intended that the foregoing detailed description be regarded as illustrative rather than limiting and that it be understood that it is the following claims, including all equivalents, which are intended to define the scope of this invention.

What is claimed is:

1. For use in a communication system, a signal receiving unit comprising:

a receiver for receiving incoming communication signals from a transmitting unit, the incoming communication signal having an associated signal quality value and an associated received signal strength, the incoming communication signals periodically comprising control signals including an upper threshold signal strength value, a lower threshold signal strength value, and a nominal signal quality value, a processor in communication with the receiver, the processor being adapted to (a) set a power control bit to a first value if the received signal strength is lower than the lower threshold signal strength value; (b) to set the power control bit to a second value if the received signal strength is higher than the upper threshold signal strength value; (c) to set the power control bit to the first value if the signal quality value is lower than the nominal signal quality value and the received strength signal is both higher than the lower threshold signal strength value and lower than the upper threshold signal strength value; and, (d) to set the power control bit to the second value if the signal quality value is higher than the nominal signal quality value and the received strength signal is both higher than the lower threshold signal strength value and lower than the upper threshold signal strength value; and, a transmitter in communication with the processor for transmitting the power control bit set by the processor to the transmitting unit.

2. A receiving unit as defined in claim 1 wherein the receiving unit is a TDMA capable device.

3. A receiving unit as defined in claim 1 wherein the receiving unit comprises a mobile terminal.

4. A receiving unit as defined in claim 1 wherein the receiving unit comprises a gateway.

5. A receiving unit as defined in claim 1 wherein the receiving unit comprises a satellite.

6. A receiving unit as defined in claim 1 further comprising a switch for selectively coupling the receiver to an antenna for receiving the incoming communication signals from the transmitting unit.

7. A receiving unit as defined in claim 6 wherein the switch is connected to the transmitter for selectively coupling the transmitter to the antenna for transmitting outgoing communication signals to the transmitting unit.

8. A receiving unit as defined in claim 7 wherein the outgoing communication signal comprise the control bit set by the processor.

9. A receiving unit as defined in claim 7 wherein the antenna receives the incoming communication signals from the transmitting unit via a satellite.

10. A receiving unit as defined in claim 9 further comprising a cellular transmit/receive module and a second antenna to permit communication with a cellular communication system.

11. A receiving unit as defined in claim 1 wherein the transmitting unit comprises:

a second receiver for receiving the power control bit from receiving unit;

a second transmitter for transmitting the incoming communication signals to the receiving unit; and a second processor in communication with the second receiver for adjusting transmission power of the second transmitter in response to the control bit received from the receiving unit.

12. A receiving unit as defined in claim 11 wherein the second processor accumulates the power control bits received from the receiving unit over a predetermined time period and increases the transmission power of the second transmitter if a predetermined amount of the accumulated power control bits have the first value.

13. A receiving unit as defined in claim 11 wherein the second processor accumulates The power control bits received from the receiving unit over a predetermined time period and decreases the transmission power of the second transmitter if a predetermined amount of the accumulated power control bits have the second value.

* * * * *